United States Patent [19]

Marchioro

[11] 4,048,701
[45] Sept. 20, 1977

[54] DEFLECTION COMPENSATING ROLL

[75] Inventor: Ignazio Marchioro, Schio, Italy

[73] Assignee: Escher Wyss Limited, Zurich, Switzerland

[21] Appl. No.: 738,442

[22] Filed: Nov. 3, 1976

[30] Foreign Application Priority Data

Nov. 4, 1975 Switzerland .............. 14182/75

[51] Int. Cl.² ............................................. B21B 13/02
[52] U.S. Cl. ................................................ 29/116 AD
[58] Field of Search ...... 29/116 AD, 113 AD, 116 R, 29/113 R

[56] References Cited

U.S. PATENT DOCUMENTS

| 3,587,152 | 6/1971 | Hold | 29/116 AD |
|---|---|---|---|
| 3,703,862 | 11/1972 | Appenzeller | 29/113 AD X |
| 3,757,398 | 9/1923 | Urban | 29/116 AD |
| 3,802,044 | 4/1974 | Spillman et al. | 29/113 AD |
| 3,879,827 | 4/1975 | Lehmann | 29/116 AD |
| 3,969,801 | 7/1976 | Dolenc et al. | 29/116 AD |
| 3,997,953 | 12/1976 | Christ et al. | 29/116 AD |
| 4,007,522 | 2/1977 | Hold et al. | 29/116 AD |

FOREIGN PATENT DOCUMENTS

| 1,277,793 | 9/1968 | Germany | 29/113 AD |

Primary Examiner—Alfred R. Guest
Attorney, Agent, or Firm—Pennie & Edmonds

[57] ABSTRACT

A deflection compensating roll is disclosed which comprises a support beam, a roll shell rotatably mounted about and defining with said beam an intermediate space therebetween and at least one hydrostatic support element engaged between the beam and the shell for exerting a force against the interior of the shell. The surface of the support element facing the interior of the shell is provided with a plurality of recesses which are supplied with fluid so that a hydrostatic fluid cushion is formed between the face of the support element and the interior of the roll shell. The beam has a longitudinally extending chamber and means for sealing a first region of the chamber which communicates with the fluid receiving recesses from a second region of the chamber which communicates with the intermediate space between the beam and the shell. The first and second regions of the chamber respectively define a conduit for supplying fluid to the support element and a conduit for discharging fluid flowing into the intermediate space from the recesses. The sealing means may include a tubular member disposed in the chamber with the end portions thereof being in fluid-tight engagement with the wall of the chamber. In this arrangement, the annular space between the outer surface of the tubular member and the wall of the chamber communicates with the intermediate space between the beam and the shell and serves as the conduit for discharge of the fluid, while the interior of the tube communicates with the recesses in the support element and serves as the conduit for supplying fluid thereto. A device such as a scoop ring disposed in the intermediate space may be provided for feeding fluid from the intermediate space to the annular space between the tubular member and the wall of the chamber.

22 Claims, 7 Drawing Figures

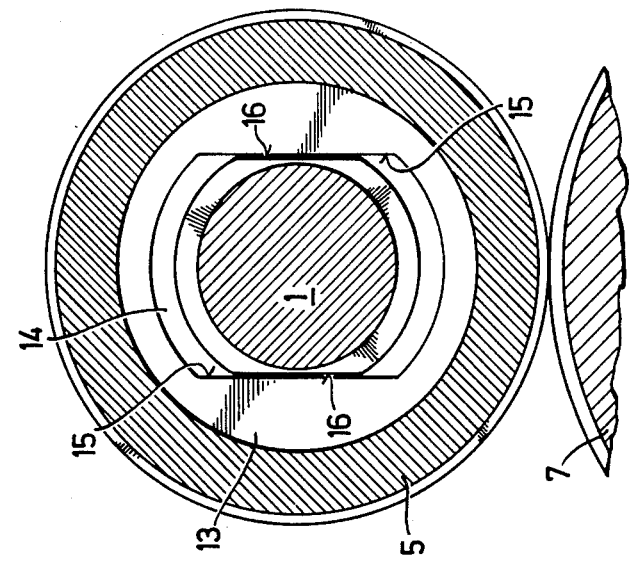
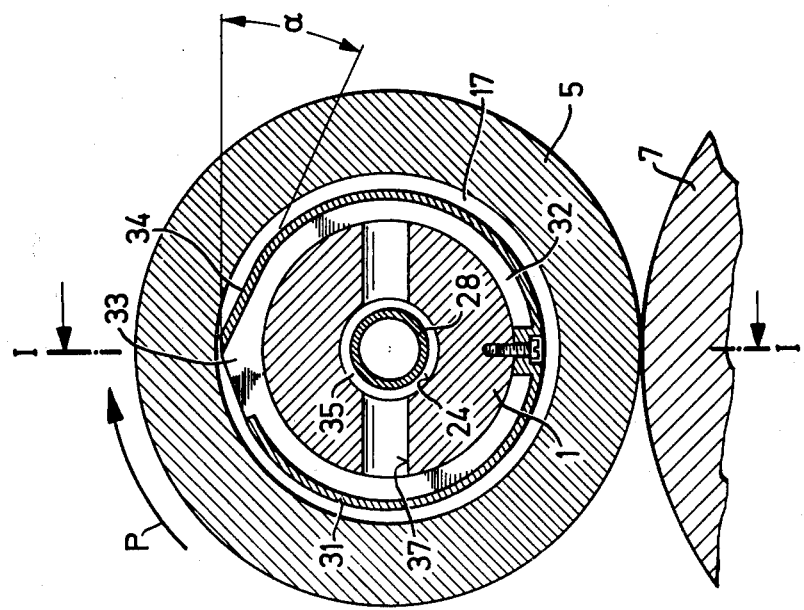

DEFLECTION COMPENSATING ROLL

BACKGROUND OF THE INVENTION

1. Field of the Invention

This invention relates to a deflection compensating press roll.

2. Description of the Prior Art

Deflection compensating rolls, such as those described, for example, in U.S. Pat. No. 3,802,044, comprise a stationary support beam and a roll shell rotatably mounted about the beam. The roll shell is supported on at least one hydrostatic support element which is movably disposed in a cavity formed in the beam and is pressed against the roll shell by hydraulic fluid supplied under pressure to the cavity. The surface of the support element facing the interior of the shell is provided with hydrostatic bearing pockets which are supplied with fluid from the cavity through throttle ducts formed in the support element so that a hydrostatic fluid cushion is formed between the face of the support element and the roll shell by the flow of fluid from the pockets. The hydraulic fluid is supplied to the cavity through a bore formed in the support beam and the fluid discharging from the bearing pockets of the support element flows into the intermediate space between the roll shell and the beam.

In deflection compensating rolls of this type, there are difficulties in discharging from the roll the pressure fluid, for example oil, flowing from the hydrostatic support element or elements into the intermediate space between the shell and the beam. The reason for this is that complicated means are required for discharging the fluid if it is discharged from the intermediate space through the end of the roll. Moreover, in such a construction, there is still the risk of pollution of the environment by the oil and the risk of contamination of the oil. I have invented a deflection compensating roll which successfully avoids these disadvantages and in which the pressure fluid flowing from the hydrostatic support element is continuously discharged from the roll through a completely closed path so that there is no risk of contamination of the hydraulic fluid itself or pollution of the environment by the hydraulic fluid.

SUMMARY OF THE INVENTION

In accordance with the invention, the roll comprises a stationary support beam, a roll shell rotatably mounted about and defining with the beam an intermediate space therebetween. The roll shell is supported on at least one support element movably disposed in a cavity formed in the beam which is pressed against the interior of the shell by pressure fluid supplied to the cavity. The end portion of the support element facing the interior of the shell is provided with fluid receiving recesses which are connected with the cavity by throttling ducts or passages extending through the support element and communicate with the intermediate space between the beam and the shell. The beam has a longitudinally extending inner chamber or bore and means for sealing a first region of the bore which communicates with the cavity from a second region of the bore which communicates with the intermediate space between the beam and the shell. The first and second regions of the bore respectively define a conduit for supplying pressure fluid to the support elements and a conduit for discharging from the intermediate space fluid flowing therein from the recesses.

Preferably, the sealing means includes a tubular member disposed in the longitudinally extending bore with the end portions thereof being in fluid-tight engagement with the wall of the bore. In this arrangement, the annular space between the outer surface of the tubular member and the wall of the bore is connected with the intermediate space by a transverse bore formed in the beam and serves as the conduit for discharging the fluid from the intermediate space. The interior of the tubular member is connected with the cavity by a duct formed in the beam and serves as a conduit for supplying hydraulic fluid to the support element.

In such an arrangement, the tubular member disposed in an exiting longitudinal bore of the beam thus provides both a conduit for supplying fluid to the support element and a closed conduit for the discharge of the hydraulic fluid with minimum expenditure.

Advantageously, the roll is provided with a device disposed in the intermediate space between the shell and the beam for feeding the fluid from the intermediate space into the annular space between the outer surface of the tubular member and the wall of the bore.

In principle, it is possible to discharge the fluid from the intermediate space through the transverse bore connecting it with the annular space without the need for a fluid feeding device. The fluid feeding device, however, makes it possible, depending upon its construction, to remove a greater volume of fluid from the intermediate space and/or utilize part of the kinetic energy of the fluid moving together with the rotating shell to discharge it from the roll.

Preferably, the fluid feeding device is in the form of a scoop ring mounted about the beam in the intermediate space between the beam and the roll shell. The scoop ring has an inner cavity which is connected to the annular space between the outer surface of the tubular member and the wall of the bore by a transversely extending bore in the beam. The top zone of the scoop ring has an aperture and a surface which is immersed in a ring of fluid formed about the interior of the shell during operation. The surface is inclined at an acute angle to the circumferential direction of the roll shell so that the fluid in the intermediate space is deflected by the inclined surface into the aperture.

During operation, a ring of hydraulic fluid forms about the interior of the shell in the intermediate space between the roll shell and the beam under the influence of centrifugal force due to the rotation of the shell. The inclined surface of the scoop ring continuously engages a part of the fluid ring formed about the interior of the roll shell and deflects the fluid through the aperture into the internal cavity of the ring. The hydraulic fluid then flows from the cavity through the transverse bore and into the annular space between the outer surface of the tubular member and the wall of the bore by gravity.

Alternatively, the fluid feeding device may be in the form of a tube disposed in the transverse bore in the beam which connects the intermediate space with the annular space between the outer surface of the tubular member and the wall of the bore. One end of the tube projects into the intermediate space and has a surface which is inclined at an acute angle to the circumferential direction of the roll shell and is immersed in the fluid in the intermediate space during operation. In this arrangement, some of the kinetic energy of the fluid rotating with the roll shell is utilized for its discharge. This embodiment is thus particularly suitable for rolls whose shell has a relatively high rotational speed.

BRIEF DESCRIPTION OF THE DRAWINGS

Other objects, features and advantages of the invention will be apparent from the following description thereof with reference to the accompanying drawings, in which:

FIG. 2 is a sectional view taking along line II—II of FIG. 1;

FIG. 3 is a sectional view taken along line III—III of FIG. 1;

DETAILED DESCRIPTION OF THE PREFERRED EMBODIMENTS

Figure 1:
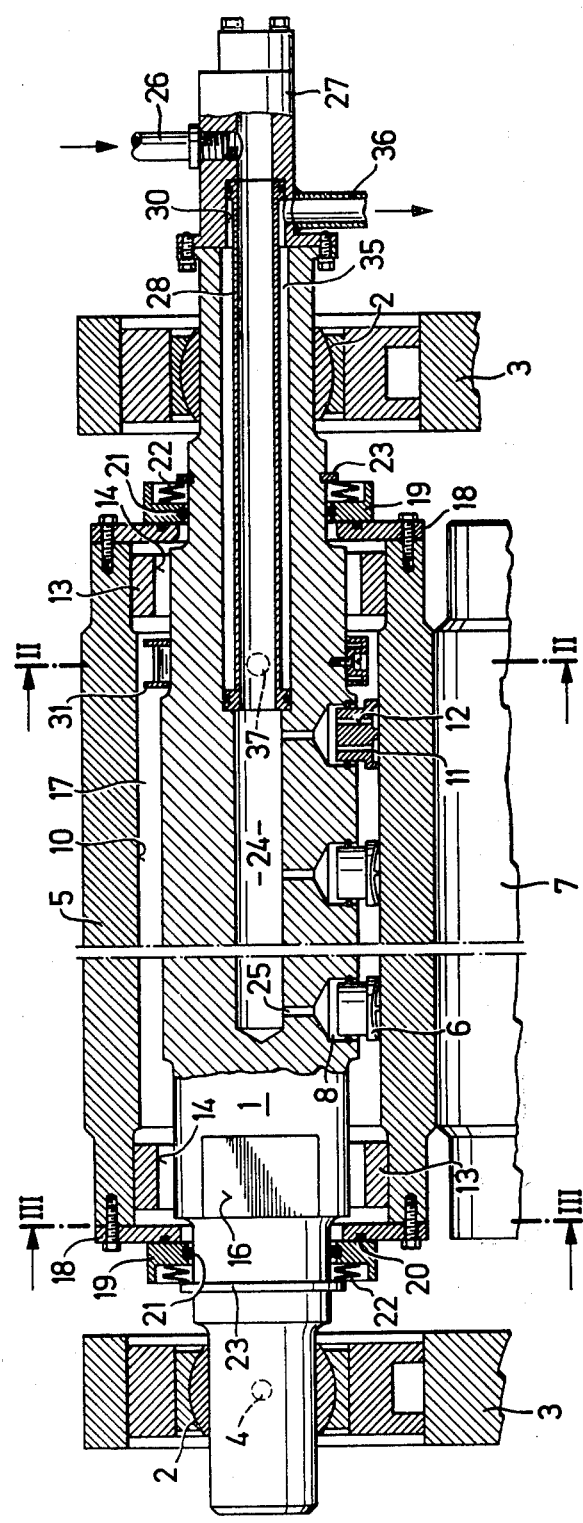
FIG. 1 is a sectional view of a deflection compensating roll according to the invention.

Referring now to the drawings, FIG. 1 shows a deflection compensating roll of the type described in U.S. Pat. Nos. 3,802,044 and 3,885,283. The roll comprises a stationary beam 1 supported in spherical bearings 2 mounted in a frame 3 and secured against rotation by a pin 4. A cylindrical roll shell 5 is rotatably mounted about the support beam 1 and is pressed by hydrostatic support elements 6 against a co-acting roll 7, which is also mounted in the frame 3 by bearings (not shown).

The hydrostatic support elements 6 may preferably be of the construction described in U.S. Pat. No. 3,802,044, and are in the form of pistons seated in seal-tight relationship in bores or cylinders 8 formed in the beam 1. The support elements 6 are guidably displaceable in a substantially radial direction with respect to the axis of the roll and are also tiltable in the associated cylinders 8. The running or bearing surfaces of the support elements 6 facing the inner surface 10 of the roll shell 5 are provided with hydrostatic fluid pockets 11 which are connected to the associated cylinders 8 by throttle bores 12.

As shown in FIGS. 1 and 3, a guide ring 13 is rotatably mounted within each end of the roll shell 5. The guide rings 13 may be of the type described in U.S. Pat. No. 3,885,283 which have elongated apertures 14 with flat parallel guide surfaces 15 which are in sliding engagement with mating parallel guide surfaces 16 on the support beam 1. The elongated apertures 14 of the guide rings 13 permit the roll shell 5 to move laterally with respect to the beam 1 in the plane of the hydrostatic support elements 6 and hence the axes of the bores 8.

The intermediate space 17 between the beam 1 and the roll shell 5 is sealed from the exterior by sealing plates 18 and sealing washers 19. The sealing plates 18 are secured to the roll shell 5 and each has a groove 20 in which is disposed a sealing washer. The sealing washers 19 are tiltable with respect to the beam 1 and each has a central bore of a diameter larger than the diameter of that portion of the beam 1 on which it is mounted. A sealing ring 21 disposed between each sealing washer 19 and the beam 1 provides a fluid-tight seal therebetween. The sealing washers 19 are pressed against the sealing plates 18 by cup springs 22 which bear against support ring 23, for example spring retaining rings, disposed in grooves formed in the beam 1.

The beam 1 has a stepped axially extending central bore or chamber 24 which is connected to a stepped bore 30 in a connecting member 27 attached to one end of the beam. The bore 24 is connected with the cylinders 8, containing the support elements 6, by radial bores 25 and is supplied with hydraulic pressure fluid from a supply line 26 via bore 30 in member 27.

The enlarged portion of the central bore 24 contains a tube 28 which extends into the enlarged portion of the bore 30 in the connecting member 27. The end portions of the tube 28 are in seal-tight engagement with the walls of bores 24 and 30 so that an annular space 35 is formed between the outer surface of tube 28 and the walls of bores 24 and 30 which is sealed off from the remaining portions of the bores 24 and 30. The interior of the tube 28 connects the pressure fluid line 26 with the portion of the central bore 24 which communicates with the bores 25 leading to cylinders 8.

As shown in FIGS. 1 and 2, a scoop ring 31 is disposed in the intermediate space 17 between the beam 1 and the roll shell 5. The scoop ring 31 encircles the beam and has an inner annular cavity 32 which is sealed off from the exterior. No absolutely hermetic seal is required between the cavity 32 and the intermediate space 17. The top zone of the ring 31 has an aperture 33 and a scoop plate 34 which projects beyond the circumference of the ring 31 and is inclined at an acute angle α with respect to the circumferential direction of the roll shell. A transverse bore 37, extending through the beam 1 at the position of the ring 31, connects the annular cavity 32 of ring 31 to the annular space 35 between the outer wall of the tube 28 and the inner wall of the enlarged portion of the bore 24.

As will be apparent from FIG. 1, member 27 is connected to a discharge conduit 36 which communicates with the annular space 35. The hydraulic fluid flowing from the pockets 11 of the support elements is thus discharged from the roll via line 36 and fed to a tank from which it can be delivered to input line 26 by a pump installation (not shown).

Figure 4:
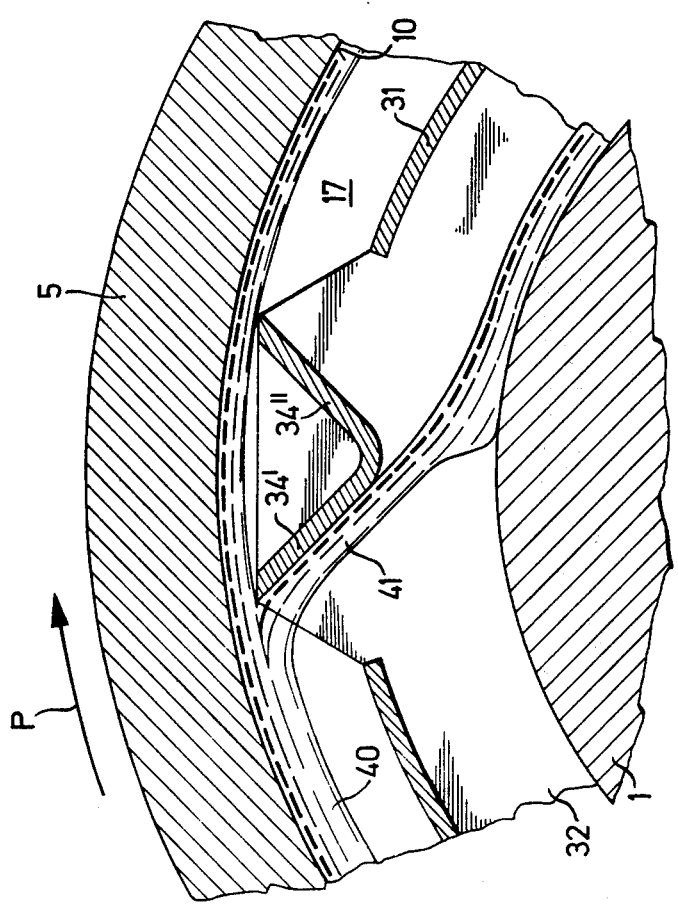
FIG. 4 is a partial sectional view of another embodiment of the invention.

While in the embodiment of the scoop ring shown in FIG. 2, the scoop plate 34 serves to feed the fluid from the intermediate space 17 into the annular cavity 32 for clockwise rotation of the roll shell 5 as indicated by arrow P; FIG. 4 shows an embodiment of a scoop ring suitable for use with a roll shell rotating in either a clockwise or counterclockwise direction. Since the embodiments of FIGS. 2 and 4 operate in a similar manner, the operation of the invention will be explained with reference to FIG. 4.

Referring to FIG. 4, the scoop ring 31, there shown, is provided with two scoop plates 34' and 34" directed in different directions. Scoop plate 34' is designed to feed fluid for the direction of rotation of the shell shown by arrows P in FIGS. 2 and 4 while scoop plate 34" is designed for the opposite direction of rotation.

During operation, the hydraulic fluid discharging from the support elements 6 forms, under the influence of centrifugal force, a ring of fluid 40 in the intermediate space 17. Depending on the direction of rotation, the appropriate scoop plate, plate 34' in the case shown in FIG. 4, cuts a sub-flow 41 out of the ring of fluid and directs it through the aperture into the annular cavity 32. This sub-flow of fluid drops into the cavity 32, flows through the bore 37 into the annular space 35 and is discharged from the roll through line 36.

In the deflection compensating roll of the invention, the hydraulic fluid is thus discharged from the intermediate space 17 of the roll through completely closed ducts and conduits avoiding contamination of the fluid and pollution of the environment.

Although the invention has been explained with reference to a deflection compensating roll comprising a plurality of support elements 6 in the form of pistons, the invention is also applicable to a roll having a single elongated strip-like support element which is also described in U.S. Pat. No. 3,802,044.

Figure 5:
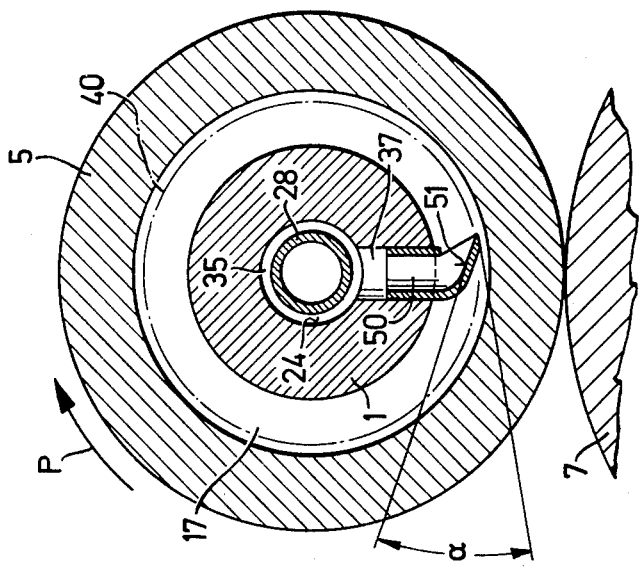
FIG. 5 is a sectional view corresponding to FIG. 2 of a further embodiment of the invention.

FIG. 5 shows another embodiment of the invention in which a scoop tube 50 serves as a fluid feeding device. The tube 50 extends into the intermediate space 17 between the roll shell 5 and the beam 1, and during operation is immersed in the fluid present in this intermediate space. Like the scoop ring 31, the scoop tube 50 has at its end a surface 51 inclined by an acute angle α to the circumferential direction of the roll shell. The other parts of FIG. 5 corresponding to the parts shown in FIGS. 1 and 2 have been given like references.

During operation, the fluid formed in a ring 40 about the interior of shell 5 is deflected by the inclined surface 51 into the tube 50 and flows through the latter and the transverse bore 37 into the annular space 35. In the embodiment of FIG. 5, the kinetic energy of the fluid is partly converted to pressure resulting in an increased outflow velocity of the fluid.

In the embodiments shown in FIGS. 1 to 4, the fluid is discharged from the interior cavity of the scoop ring 31 under the influence of the static head of fluid in the scoop ring. In the embodiment shown in FIG. 5, however, the kinetic energy of the fluid is used for the outflow.

Figure 6:
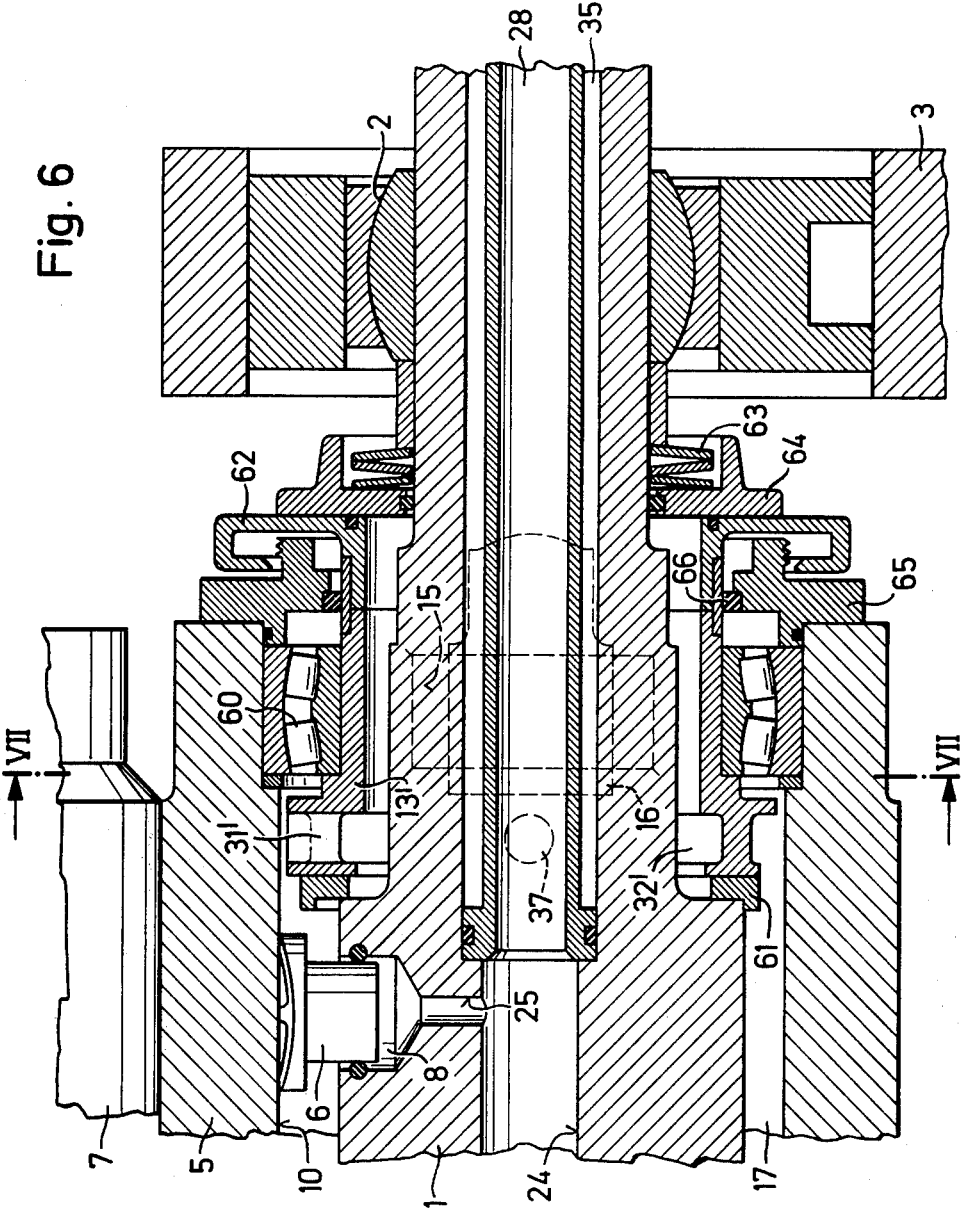
FIGS. 6 and 7 are sectional views of another embodiment of the invention.
Figure 7:
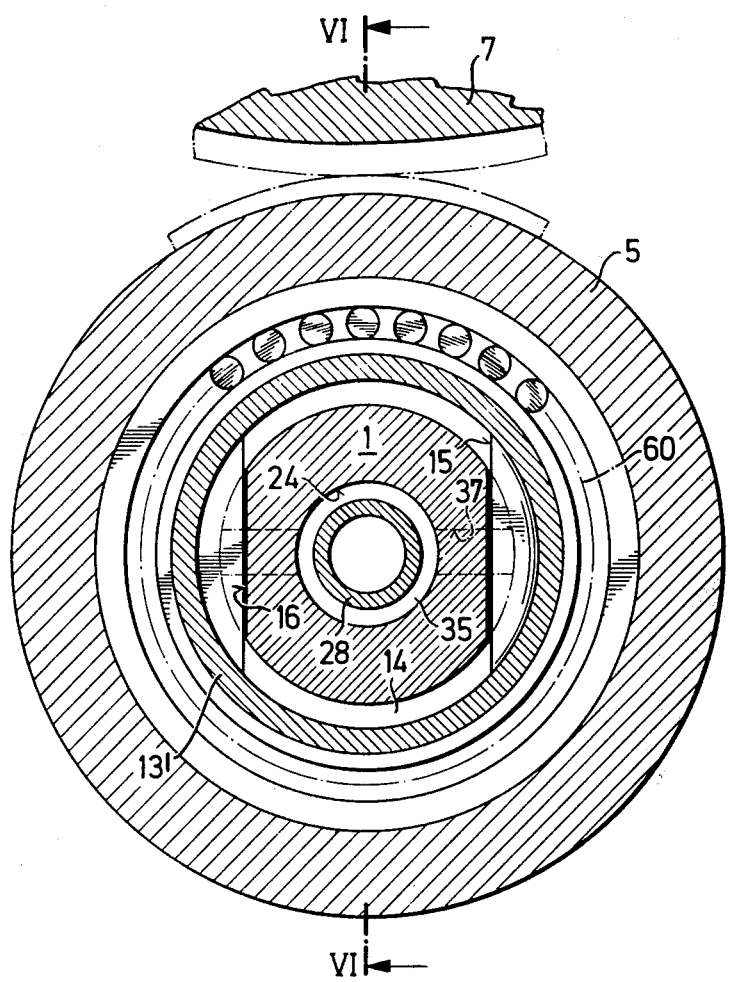

FIGS. 6 and 7 show another embodiment of the invention with like parts having like reference characters. In this embodiment the guide ring 13 of FIG. 1 is replaced by a guide ring 13' mounted rotatably in a rolling bearing 60 secured in the roll shell 5. A scoop ring 31' is secured to the left-hand end of the guide ring 13' as viewed in FIG. 6. The scoop ring 31' may be of substantially the same construction as the scoop ring 31 in the embodiments shown in FIGS. 1 to 4.

A sealing ring 61 is disposed between the scoop ring 31' and the beam 1. An end ring 62 adjoins the right-hand end of the guide ring 13' and a sealing plate 64 is pressed against it by a cup spring 63. An end ring 65 is secured to the roll shell 5 and a seal 66 is provided between the end rings 62 and 65.

In the embodiment shown in FIG. 6, the scoop ring 31' together with the shell 5 is adjustable with respect to the beam 1. The scoop ring 31' can therefore be positioned with its inlet aperture very near the inner surface of the shell 5. The hydraulic fluid in the intermediate space 17 is fed by the scoop ring 31' into the cavity 32' between the beam 1 and the rings 13' and 62 and the plate 64. The fluid then flows from the cavity 32' through the bore 37 into the annular space 35 and is discharged therefrom in the manner hereinabove described.

An additional advantage of the embodiment shown in FIGS. 6 and 7 is that there is no rotary movement between the plate 64 and the end ring 62 so that the seal between these parts is required to seal only under stationary conditions and slow adjustment movements. The sealing of the parts rotating relative to each other is effected by the correspondingly constructed seal 66.

I claim:

1. A deflection compensating roll which comprises a stationary support beam, a roll shell rotatably mounted about and defining with said beam an intermediate space therebetween, and at least one hydrostatic support element engaged between said beam and said shell for exerting a force against the interior of said shell, the end portion of each support element facing the interior of said shell having at least one fluid receiving recess formed therein and communicating with said intermediate space, said beam having an internal longitudinally extending chamber and means for sealing a first region of said chamber from a second region thereof, said first region of said chamber communicating with each fluid receiving recess and defining a conduit for supplying pressure fluid thereto, said second region of said chamber communicating with said intermediate space and defining a conduit for discharging from said intermediate space fluid flowing thereto from said recess.

2. A deflection compensating roll according to claim 1, wherein said end portion of each support element has a plurality of fluid recesses formed therein.

3. A deflection compensating roll according to claim 2, wherein said sealing means includes a tubular member disposed in said chamber, the end portions of said tubular member being in fluid-tight engagement with the wall of said chamber, the outer surface of said tubular member intermediate said end portions and the wall of said chamber defining said second region therebetween.

4. A deflection compensating roll according to claim 3, wherein said support element is movably mounted in a cavity formed in said beam, said cavity being connected with each recess of said plurality by a throttling passage extending through said support element and with said first region by a transverse bore formed in said beam.

5. A deflection compensating roll according to claim 1, including means for sealing said intermediate space from a region exterior of said roll.

6. A deflection compensating roll according to claim 5, including means disposed in said intermediate space between said beam and said shell for feeding fluid from said intermediate space to said second region.

7. A deflection compensating roll according to claim 6, wherein said second region of said chamber communicates with said intermediate space through a transverse bore formed in said beam.

8. A deflection compensating roll according to claim 7, wherein said fluid feeding means includes a scoop ring positioned within said intermediate space and disposed about said beam, said scoop ring defining an inner cavity communicating with said second region through said transverse bore and communicating with said intermediate space through an aperture formed in said scoop ring, said scoop ring having a surface portion adjacent said aperture configured to engage fluid in said intermediate space and to direct the fluid through said aperture into said annular cavity during operation.

9. A deflection compensating roll according to claim 8, wherein said fluid scooping surface portion of said scoop ring defines an acute angle with a plane generally tangent to an adjacent inner surface portion of said roll shell.

10. A deflection compensating roll according to claim 7, wherein said fluid feeding means includes a tube disposed in said transverse bore, one end of said tube having a surface portion which extends into said intermediate space and is configured to engage fluid therein and to direct the fluid into said tube during operation.

11. A deflection compensating roll according to claim 10, wherein said fluid scooping surface portion of said scoop ring defines an acute angle with a plane generally tangent to an adjacent inner surface of said roll shell.

12. A deflection compensating roll according to claim 6, including a guide ring rotatably mounted within each end of said roll shell and mounted on said beam for motion transversely with respect to the longitudinal axis of said beam.

13. A deflection compensating roll according to claim 12, wherein said fluid feeding means is secured to one of said guide rings.

14. A deflection compensating roll which comprises a support beam, a roll shell rotatably mounted about and defining with said beam an intermediate space therebetween, and at least one hydrostatic support element movably mounted in a cavity formed in said beam for exerting a force against the inner surface of said shell, the end portion of said support element facing the interior of said shell having a plurality of fluid receiving recesses formed therein which communicate with said intermediate space, each of said recesses being connected with said cavity by a throttling passage extending through said support element, said beam having a longitudinally extending bore, a duct for connecting said cavity with said bore, a tubular member disposed in said bore, the outer surface of said tubular member and the wall of said bore defining an annular space therebetween, and means for sealing said annular space from the remaining portion of said bore, the interior of said tubular member being in communication with said duct and defining a conduit for supplying pressure fluid to said cavity, said annular space being connected with said intermediate space by an additional duct formed in said beam and defining a conduit for discharging from said intermediate space fluid flowing thereto from said recesses.

15. A deflection compensating roll according to claim 14, including means for sealing said intermediate space from a region exterior of said roll.

16. A deflection compensating roll according to claim 15, wherein said tubular member extends from a portion of said beam disposed within said roll shell to a portion of said beam disposed beyond the end of said shell.

17. A deflection compensating roll according to claim 16, including means disposed in said intermediate space between said beam and said shell for feeding fluid from said intermediate space to said annular space.

18. A deflection compensating roll according to claim 17, wherein said fluid feeding means includes a scoop ring disposed about said beam and positioned within said intermediate space, said scoop ring defining an inner cavity connected with said annular space through said additional duct and connected with said intermediate space through an aperture formed in said scoop ring, said scoop ring having a surface portion adjacent said aperture configured to engage fluid in said intermediate space and to direct the fluid through said aperture into said annular cavity during operation.

19. A deflection compensating roll according to claim 18, wherein said fluid scooping surface portion of said scoop ring defines an acute angle with a plane generally tangent to an adjacent inner surface portion of said roll shell.

20. A deflection compensating roll according to claim 18, including a guide ring rotatably mounted within each end of said roll shell and mounted on said beam for motion transversely with respect to the longitudinal axis of said beam.

21. A deflection compensating roll according to claim 20, wherein said scoop ring is secured to one of said guide rings.

22. A deflection compensating roll according to claim 17, wherein said fluid feeding means includes a tube disposed in said additional duct, one end of said tube having a surface portion which extends into said intermediate space and is configured to engage the fluid therein and direct it into said tube during operation.

* * * * *